United States Patent [19]

Zaromb

[11] 4,207,382

[45] Jun. 10, 1980

[54] FLUIDIZED AIR-DEPOLARIZED ELECTRODES AND RELATED APPARATUS AND METHODS

[76] Inventor: Solomon Zaromb, 171 Clifton Ave., Newark, N.J. 07104

[21] Appl. No.: 938,395

[22] Filed: Aug. 31, 1978

Related U.S. Application Data

[63] Continuation of Ser. No. 813,483, Jul. 7, 1977, abandoned.

[51] Int. Cl.² .................................... H01M 12/06
[52] U.S. Cl. ............................. 429/19; 429/27; 429/34
[58] Field of Search .............. 429/13, 14, 15, 17, 429/19, 27, 34

[56] References Cited

U.S. PATENT DOCUMENTS

| | | | |
|---|---|---|---|
| 2,759,038 | 8/1956 | Marsal | 429/28 |
| 3,409,471 | 11/1968 | Sturm et al. | 429/14 |
| 3,525,643 | 8/1970 | Spahrbier et al. | 429/15 |
| 3,594,234 | 7/1971 | Lang et al. | 429/28 |

*Primary Examiner*—Anthony Skapars

[57] ABSTRACT

Improved oxygen-consuming electrochemical cells are provided with a fluidized-bed oxygen absorber (1), wherein electrolyte-wetted carrier particles (3), especially electronically conductive catalyst particles, are oxygen-enriched, and a substantially bubble-free fluidized-bed cathode (12), wherein the oxygen transported by said carrier particles is electrochemically reduced. Carrier particles comprising activated carbon may provide sufficient surfaces area per unit weight to assure adequate oxygen transport. An intermediary oxidation-reduction couple may be included in the electrolyte to facilitate these oxygen-absorption and electro-reduction steps. The oxygen absorber (1) may be either separated from the cathode (12) or may form part of the same compartment (28), in which case an oxygen-permeable electrolyte-impermeable membrane (23) must be provided through which oxygen from ambient air may readily pass and be rapidly picked up and transported by the fluidized carrier particles (3).

The fluidization of the carrier particles (3) in the oxygen absorber (1) and the cathode (12) may be effected in a moving vehicle by an air interceptor means (6) which utilizes the pressure of air impinging on such a vehicle to effect air flow in the absorber (1) and fludization within the cathode (12) without recourse to any significant auxiliary power.

18 Claims, 3 Drawing Figures

FLUIDIZED AIR-DEPOLARIZED ELECTRODES AND RELATED APPARATUS AND METHODS

This is a continuation of my application Ser. No. 813,483, filed July 7, 1977, now abandoned.

BACKGROUND OF THE INVENTION

This invention relates to improved fluidized-bed or slurry-type air-depolarized electrodes, and to electrochemical processes and apparatus, especially power sources, utilizing such electrodes.

Many modern batteries and fuel cells utilize oxygen from the air and/or other reactants which are not readily soluble in the battery or fuel cell electrolyte and which can otherwise not be easily supplied to the active sites of the so-called electrode catalyst at which they must electrochemically react for satisfactory operation of said batteries or fuel cells. This limited solubility of the reactant, and hence its restricted access to the active catalyst sites, severely limits the rate at which the insoluble or poorly soluble reactant can be electrochemically consumed, and hence the current density and power density of the battery or fuel cell.

Another serious drawback of many of these electrochemical power sources is that the active catalyst sites at the electrode surfaces at which said poorly soluble reactants can usefully react may be subject to inactivation by poisoning or clogging. Once these sites are inactivated, the electrode stops functioning, and the entire battery or fuel cell becomes inoperative.

It is an object of my invention to substantially increase the current density and hence the power density of such electrodes, especially oxygen-consuming electrodes, so as to permit them to meet high power requirements, e.g., in the propulsion of electric vehicles.

It is another object of my invention to increase the lifetime of such electrodes, and of batteries of fuel cells utilizing same, by providing the means to replace said electrode catalyst without dismantling or otherwise tampering with the rest of the power source system.

It is yet another object of my invention to render said active catalyst sites more effective in a functioning battery, fuel cell or other electrochemical system, device or process, so as to permit the use of a relatively inexpensive catalyst, such as activated carbon or rare earth cobaltite, instead of platinum or other noble metals, and so as to reduce the electrode polarization and thereby increase the overall energy efficiency of the battery, fuel cell or electrochemical process.

It is still another object of my invention to apply the concept of fluidized-bed or slurry-type electrode to air-consuming electrochemical systems and processes in a practicable and advantageous manner.

The use of slurry-type electrodes in hydrogen- and oxygen-consuming fuel cells has been shown to result in considerable improvements in current density. However, the slurry-type oxygen-depolarized electrodes disclosed heretofore have consisted of a three-phase mixture of electrolyte, catalyst suspension, and gaseous bubbles. Such a three-phase mixture presents severe practical problems, especially in air-depolarized electrodes, which have rendered the concept of fluidized-bed or slurry-type electrodes inapplicable thus far to fuel cells and other air-breathing systems. In particular, the direct injection of air into an electrolyte-catalyst mixture would result in entrainment of electrolyte and catalyst by the more than four volumes of nitrogen which must accompany each volume of oxygen consumed, and which must be rejected or allowed to escape from the system for satisfactory continuous operation. Moreover, the bubbles and foaming associated with a large rate of air flow through the electrolyte would interfere with ionic conductivity and thereby give rise to ohmic losses.

SUMMARY OF THE INVENTION

Briefly, my invention consists of providing an oxygen-absorbing means wherein carrier particles, especially electronically conductive catalyst particles, are covered with any oxygen-enriched electrolyte layer, and a substantially bubble-free slurry electrode, wherein a major portion of the oxygen in said oxygen-enriched layer is electrochemically reduced. An intermediary oxidation-reduction or redox couple in the electrolyte, such as iodide-iodate ions, may facilitate these oxygen-absorption and electro-reduction steps. Said oxygen-absorbing means may be either physically apart from the slurry electrode or it may form part of the same compartment. In the latter case, the oxygen-absorbing means must comprise a semi-permeable membrane, which may be made of porous polytetrafluoroethylene, through which oxygen from ambient air may readily pass and be rapidly picked up and transported towards the cathode by the fluidized carrier particles.

BRIEF DESCRIPTION OF THE DRAWINGS

My invention may best be understood with the aid of the drawings, in which.

DESCRIPTION OF THE PREFERRED EMBODIMENTS

Figure 1:
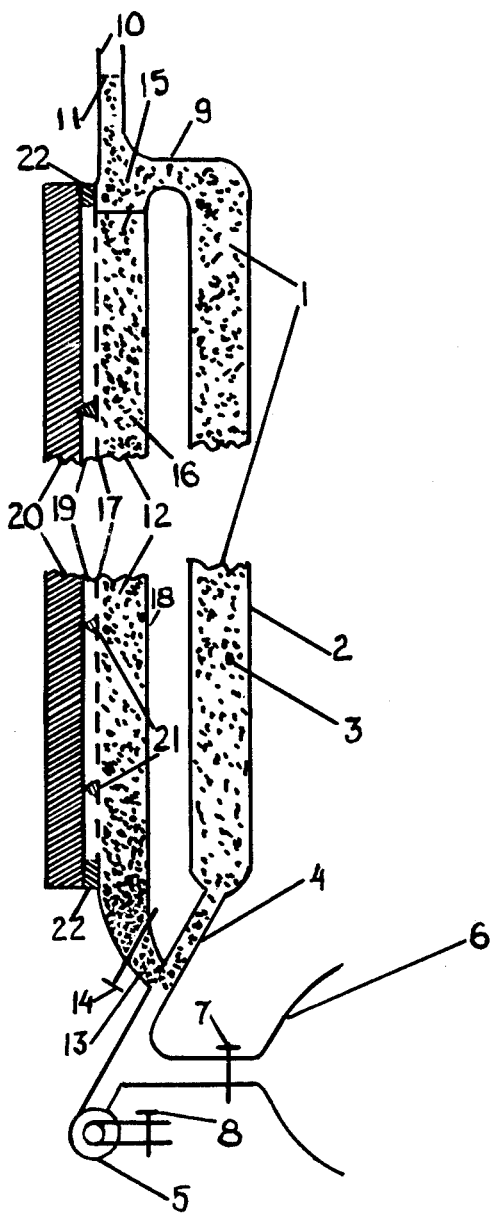
FIG. 1 is a partial schematic cross-sectional view of one preferred embodiment of my invention.

In FIG. 1, the oxygen-absorber 1 consists of a container 2 wherein wetted catalyst particles 3 are carried by a stream of air fed through an inlet 4 from either an air-blower 5 or an ambient air interceptor means 6. The latter may serve in a moving vehicle to intercept a portion of the air impinged on by said vehicle and to direct the intercepted air through valve 7 into inlet tube 4 and hence into oxygen-absorber 1. The driving force for the flow of air through absorber 1 and hence for the fluidization of the particles therein is then the pressure of the air impinging upon the moving vehicle. To utilize this driving force efficiently, the blower 5 may be closed off by means of valve 8 to prevent reverse flow of the intercepted air through blower 5. On the other hand, in a stationary system, where the air must be supplied by blower 5, the intake valve 8 is opened and valve 7 is closed so as to direct all the air from blower 5 into absorber 1.

After passing through absorber 1, the oxygen-poor nitrogen-rich air is allowed to escape through a constriction 9 and an air vent 10. A filter means 11 prevents loss of the wetted catalyst particles with the escaping air. To prevent clogging of filter means 11, the latter may comprise a cyclone separator (not shown), a self-cleaning means (not shown), and/or an intermittent back-flushing means (not shown), all of which are well known to persons skilled in the art.

Figure 2:
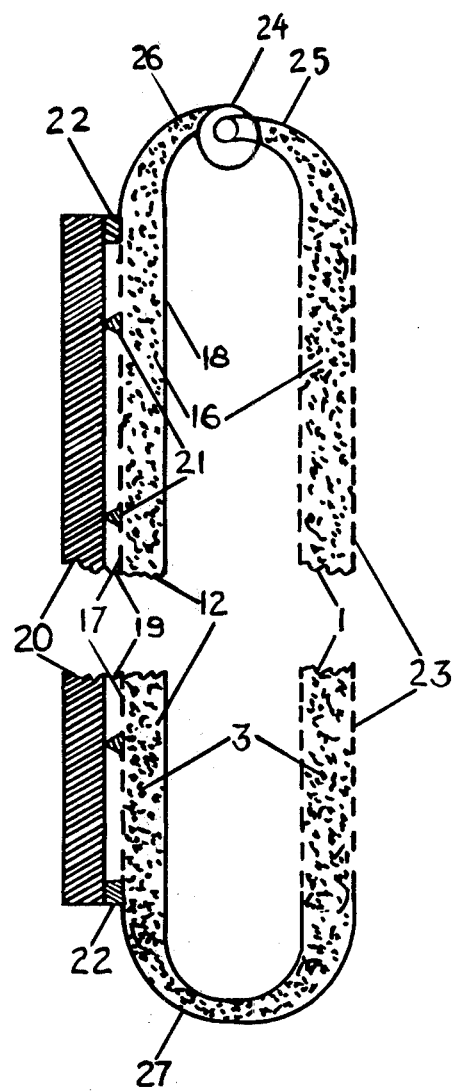
FIG. 2 is a partial schematic cross-sectional view of a second embodiment of my invention.
Figure 3:
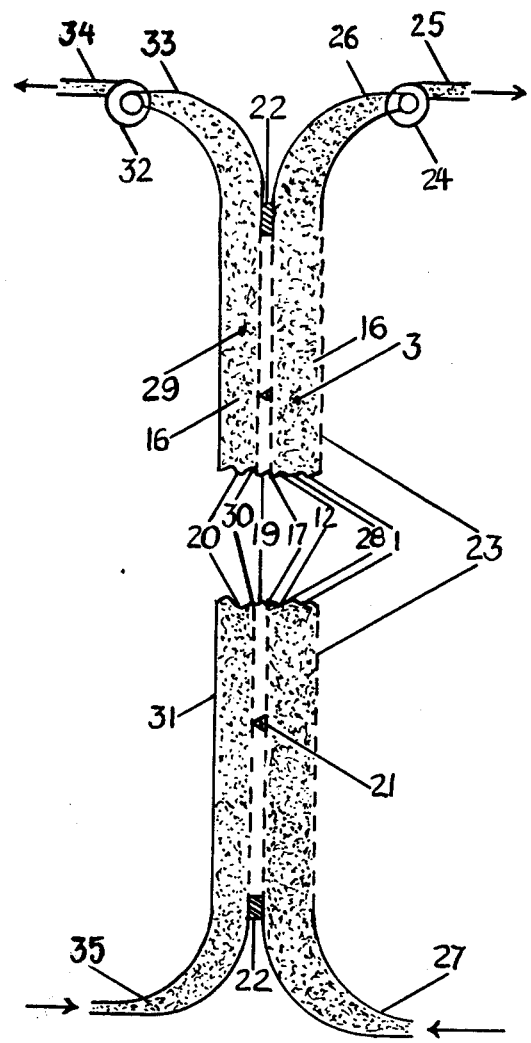
FIG. 3 is a partial schematic cross-sectional view of yet another preferred embodiment of my invention.

Oxygen-depleted wetted carrier particles are injected into inlet 4 by gravity flow from a slurry cathode 12 past a restriction 13 and a flow-adjusting valve 14. As the injected particles are carried upwards by the inflowing air, their outer layers become enriched with oxygen. The oxygen-enriched particles are carried by escaping air past the upper constriction 9 back into the upper portion 15 of cathode 12, where they are allowed to sink towards the lower constriction 13. As the oxygen-enriched particles sink through the electrolyte 16, they impinge against each other and upon the current-collecting grid 17 of slurry cathode 12, and during these contacts, the oxygen carried by said particles is electrochemically reduced to either hydroxyl ions, if the electrolyte is alkaline, or to water, if electrolyte 16 is an acid. Thus, by the time these particles settle down in constriction 13, they are again depleted of oxygen.

The flow-adjusting valve 14 is set so as to permit a sufficiently rapid circulation of wetted carrier particles to meet the current density requirements of cathode 12, and yet prevent an excessive amount of electrolyte from being carried along with particles 3 into absorber 1. The specific gravity of the carrier particles being substantially higher than that of electrolyte 16, the latter is displaced by the former near the bottom of cathode 12, and the dense slurry in restriction 13 thus forms a semi-solid plug inhibiting the flow past restriction 13 either of air from inlet 4 or of electrolyte from cathode 12.

To facilitate first the absorption of oxygen by the outer layers of the wetted carrier particles in the absorber and next the electro-reduction of the oxygen-enriched layers, an intermediary oxidation-reduction or redox couple may be dissolved in electrolyte 16. Such a redox couple may consist, for instance, of iodide/iodate ions, if electrolyte 16 is highly alkaline, or of the $NO/HNO_3$ couple, in acid electrolyte.

The current-collecting grid 17 of cathode 12 and its outer wall 18 may be made of any metal which is substantially inert to electrolyte 16. For instance, in alkaline electrolytes operating at low or moderate temperatures, the grid 17 and wall 18 may be made of nickel or stainless steel. Wall 18 may also be of a suitable non-metallic material.

Electrolyte gap 19, counter-electrode 20, insulating spacers 21, and end gaskets 22 substantially complete the electrochemical cell. Thus, in hydrogen-type fuel cells, counter-electrode 20 may be a hydrogen anode either of a conventional type or of a fluidized-bed type similar to the afore-described cathode (with pressurized hydrogen substituting for air blower 5 and interceptor 6). In metal-air power sources, electrode 20 may again be a consumable metal anode, comprising zinc, iron, aluminum, lithium, sodium, or calcium, of either the conventional type or a slurry type. On the other hand, in chlorine manufacture, counter-electrode 20 may be an anode of graphite, conductive tin oxide, titanium, or any other conductive material suitable for the electro-oxidation of chloride ions, said anode being separated from the fluidized-bed cathode by a suitable diaphragm (not shown).

One advantage of the above-disclosed embodiment of my invention is that container 2 may be made of any material that can withstand corrosion and abrasion by the air-borne wetted carrier particles, i.e., of any material that is resistant to electrolyte 16 and whose surface hardness exceeds that of the carrier particles. Another important advantage in power sources for electric vehicles is that, with the air interceptor 6, relatively little auxiliary power is needed to effectuate the aobve-outlined fluidization of particles 3, as the driving force for said fluidization derives from impingement of air against the front of the moving vehicle.

Although at least five volumes of air must flow through absorber 1 for each volume of oxygen consumed in cathode 12, this air is prevented from entering and adversely affecting the performance of cathode 12. Moreover, losses of carrier particles and/or electrolyte are much more easily controllable in the apparatus of FIG. 1 than in the heretofore disclosed systems in which the flowing air would have to bubble through an electrolyte containing a suspension of catalyst particles.

In the alternative embodiment of FIG. 2, the problem of entrainment is avoided altogether by admitting only the required amount of oxygen into the absorber. This is accomplished by having the walls of absorber 1 comprise an air-permeable electrolyte-impermeable membrane 23, which may be made of highly porous polytetrafluoroethylene or similar material. Absorber 1 is then filled with a suspension of carrier particles 3 in electrolyte 16, which is circulated by a slurry pump 24 between absorber 1 and slurry cathode 12 via interconnections 25, 26, and 27. The fluidization of carrier particles 3 within absorber 1 and cathode 12 assures rapid mass transfer between said particles and the container walls, and hence rapid enrichment of the outer layers of particles 3 with the oxygen permeating through porous membrane 23, and equally rapid electro-reduction of the oxygen carried over with these particles towards grid 17 of cathode 12. Again, as in the embodiment of FIG. 1, the electrochemical cell is completed by outer wall 18, electrolyte gap 19, counterelectrode 20, electrically insulating spacers 21, and end seals or gaskets 22.

In the embodiment of FIG. 3, the oxygen absorber 1 and slurry cathode 12 are combined into a single compartment 28, wherein fluidized carrier particles 3 in flowing electrolyte 16 are continually bouncing between air-permeable electrolyte-impermeable membrane 23, where their outer layers become enriched with oxygen, and current-collecting grid 17, where the oxygen carried by these particles is electro-reduced. The electrolyte drawn by slurry pump 24 via outlet connections 26 and 25 may be either returned to the same compartment 28 or fed to the next cell in a stack of series-connected cells (not shown).

Also shown in FIG. 3 is a slurry-type anode 20 comprising fluidized particles 29 in electrolyte 16, a current-collecting grid 30, and an outer wall 31. Fluidized particles 29 may be hydrogen-transporting electro-catalysts analogous to those used in cathode compartment 28, in which case outer wall 31 should be highly permeable to hydrogen and in contact with a hydrogen supply chamber (not shown). Alternatively, anode 20 may contain a hydrogen-rich fuel, such as ammonia or hydrazine, or particles 29 may consist of a consumable metal, such as iron, zinc, or aluminum, in which case slurry pump 32 effectuates continuous circulation permitting supply of fresh fuel or consumable metal via inlet 35 and removal of reaction product, such as $Fe(OH)_2$, $Zn(OH)_2$ or $Al(OH)_3$, via outlets 33 and 34.

The semi-permeable membrane 23 in FIGS. 2 and 3 should be preferably thin and highly porous to permit rapid permeation of oxygen. The material most suitable for such a membrane at the present time is porous polytetrafluoroethylene. To avoid damage to the membrane from abrasion by fluidized particles 3, these should be made primarily of a material softer than the membrane material, e.g., of graphite or activated carbon, with possible inclusions of silver. Thus, the embodiments of FIGS. 2 and 3, while avoiding the problem of entrainment by air, are restricted to the use of soft carrier particles.

Activated carbon is known to have a large adsorptive area per unit weight (as large as 1000 square meters/gram or higher). Hence, carrier particles made of activated carbon should facilitate oxygen transport to the cathode.

In either of the above three embodiments, both electrolyte 16 and the catalyst making up or comprised within carrier particles 3 can be readily replaced by fresh electrolyte and/or catalyst. This can be accomplished in the embodiment of FIG. 1 by having either filter means 11 removable and/or providing a side connection (not shown) to valve 14, with the latter being a 3-way valve. Similarly, in FIGS. 2 and 3, the connections 25, 26, and 27 may be made removable or provided with valve-controlled side-arms (not shown). Replacement of electrolyte or catalyst particles can then be effected through the opened connections or side-arms.

There will now be obvious to those skilled in the art many modifications and variations of the above-disclosed embodiments, which, however, will fall within the scope of my invention if defined by the following

I claim:

1. An air-breathing oxygen-consuming electrochemical cell comprising a fluidized-bed oxygen absorber and a fluidized-bed cathode, a current-collecting means forming part of said cathode, said absorber and cathode comprising fluidized wetted carrier particles, an oxygen-transfer means within said absorber for exposing said wetted particles to oxygen from air so as to permit rapid enrichment of said particles with oxygen without resort to bubbling air through or mixing air with a continuous liquid electrolyte phase, said oxygen transfer means comprising an oxygen-permeable electrolyte-impermeable membrane whose outside surface is exposed to air and whose inner surface is readily accessible to said fluidized carrier particles, near which inner surface said particles become rapidly oxygen-enriched, means for bringing the resulting oxygen-enriched particles towards said current-collecting means of said cathode where part of the oxygen carried by these particles is electroreduced, whereby said particles become partly depleted of oxygen, and means for returning said oxygen-depleted particles to said absorber.

2. The electrochemical cell of claim 1, wherein said absorber and said cathode are in separate compartments.

3. The cell of claim 1, wherein said absorber and cathode are contained within the same compartment.

4. An air-breathing oxygen-consuming electrochemical cell comprising a fluidized-bed oxygen absorber and a fluidized-bed cathode, a current-collecting means forming part of said cathode, said absorber and cathode comprising fluidized wetted carrier particles, an oxygen-transfer means within said absorber for exposing said wetted particles to oxygen from air so as to permit rapid enrichment of said particles with oxygen without resort to bubbling air through or mixing air with a continuous liquid electrolyte phase, said oxygen-transfer means comprising means for bringing said wetted particles in direct contact with air in an air-fluidized bed within said absorber, whereby said wetted particles become rapidly oxygen-enriched, means for bringing the resulting oxygen-enriched particles towards said current-collecting means of said cathode where part of the oxygen carried by these particles is electroreduced, whereby said particles become partly depleted of oxygen, and means for returning said oxygen-depleted particles to said absorber.

5. The cell of claim 1, wherein said particles are wetted with an electrolyte comprising an intermediary oxidation-reduction couple for facilatating oxygen-absorption within said absorber and subsequent electroreduction within said cathode.

6. Apparatus of claim 4, comprising also an ambient air interceptor means for intercepting air impinging on the front of a moving vehicle and utilizing the pressure of said impinging air to effect air flow through said absorber.

7. Apparatus as claimed in claim 6, wherein fluidization of said particles within said cathode is effected by gravity flow of particles carried over into the upper portion of said cathode by the air flow through said absorber.

8. Apparatus of claim 1, wherein each electrochemical cell comprises a consumable metal anode.

9. Apparatus of claim 8, wherein said consumable metal comprises aluminum, zinc, lithium, sodium, calcium, or iron.

10. Apparatus of claim 1, wherein said electrochemical cell is a fuel cell consuming a hydrogen-rich fuel.

11. Apparatus of claim 1, wherein said electrochemical cell comprises a chlorine-generating anode.

12. Apparatus of claim 1, comprising means for replacing defective catalyst particles in said cathode by fresh active catalyst particles.

13. The cell of claim 4, wherein said particles are wetted with an electrolyte comprising an intermediary oxidation-reduction couple for facilatating oxygen-absorption within said absorber and subsequent electroreduction within said cathode.

14. Apparatus of claim 4, wherein said electrochemical cell comprises a consumable metal anode.

15. Apparatus of claim 14, wherein said consumable metal comprises aluminum, zinc, lithium, sodium, calcium, or iron.

16. Apparatus of claim 4, wherein said electrochemical cell is a fuel cell consuming a hydrogen-rich fuel.

17. Apparatus of claim 4, wherein said electrochemical cell comprises a chlorine-generating anode.

18. Apparatus of claim 4, comprising means for replacing defective catalyst particles in said cathode by fresh active catalyst particles.

* * * * *